United States Patent
Yu et al.

(10) Patent No.: US 11,043,159 B2
(45) Date of Patent: Jun. 22, 2021

(54) ARRAY SUBSTRATE AND DISPLAY PANEL

(71) Applicant: WUHAN CHINA STAR OPTOELECTRONICS SEMICONDUCTOR DISPLAY TECHNOLOGY CO., LTD., Hubei (CN)

(72) Inventors: Wenjing Yu, Hubei (CN); Shingo Kawashima, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 16/630,447

(22) PCT Filed: Oct. 16, 2019

(86) PCT No.: PCT/CN2019/111470
§ 371 (c)(1),
(2) Date: Jan. 12, 2020

(87) PCT Pub. No.: WO2021/012415
PCT Pub. Date: Jan. 28, 2021

(65) Prior Publication Data
US 2021/0027695 A1    Jan. 28, 2021

(30) Foreign Application Priority Data
Jul. 24, 2019 (CN) .......................... 201910670588.4

(51) Int. Cl.
G09G 3/20 (2006.01)
G09G 3/00 (2006.01)
G02F 1/1362 (2006.01)

(52) U.S. Cl.
CPC ..... G09G 3/2092 (2013.01); G02F 1/136254 (2021.01); G09G 3/006 (2013.01);
(Continued)

(58) Field of Classification Search
CPC .. G09G 3/2092; G09G 2330/12; G09G 3/006; G09G 2290/00; G09G 2320/08; G09G 2330/02; G09G 3/18; G09G 3/3696; G02F 1/136254; G02F 1/133603; G02F 1/133612; G06F 1/22
See application file for complete search history.

(56) References Cited

FOREIGN PATENT DOCUMENTS

| CN | 101355082 A | 1/2009 |
|---|---|---|
| CN | 107038985 A | 8/2017 |

(Continued)

*Primary Examiner* — Sanjiv D. Patel
(74) *Attorney, Agent, or Firm* — Mark M. Friedman

(57) ABSTRACT

An array substrate and a display panel are provided. The array substrate includes an enable signal input terminal, a preset electric potential input terminal, and a connection resistor. The enable signal input terminal is for inputting an enable signal. The preset electric potential input terminal is for inputting a preset electric potential. The connection resistor is connected to the enable signal input terminal and the preset electric potential input terminal, and a resistance value of the connection resistor is a predetermined multiple of a resistance value of the enable signal input terminal. In the present disclosure, the enable signal can be input through the preset electric potential input terminal.

20 Claims, 4 Drawing Sheets

(52) U.S. Cl.
CPC ..... *G09G 2290/00* (2013.01); *G09G 2320/08* (2013.01); *G09G 2330/12* (2013.01)

(56) References Cited

FOREIGN PATENT DOCUMENTS

| | | |
|---|---|---|
| CN | 107065364 A | 8/2017 |
| KR | 20040046388 A | 6/2004 |
| KR | 20060012164 A | 2/2006 |
| WO | 2009134011 A2 | 11/2009 |

ARRAY SUBSTRATE AND DISPLAY PANEL

FIELD OF INVENTION

The present disclosure relates to field of display technology, and particularly relates to an array substrate and a display panel.

BACKGROUND OF INVENTION

After array substrates are manufactured, generally many tests are performed on them. During performance of a test, in order to ensure accuracy of the test, other test thin film transistors must be input a high electric potential to turn off, thereby not affecting the test result.

In prior art, an enable signal for turning off a thin film transistor is input from a testing terminal on the array substrate. However, the testing terminal often has poor connection due to impurities, so that the high electric potential signal cannot be input, and the corresponding thin film transistor is not turned off, so a screen of the array substrate may be abnormal during performing other tests.

Therefore, current array substrates have the technical problem that an enable signal cannot be input normally, and needs to be improved.

SUMMARY OF INVENTION

The present disclosure provides an array substrate and a display panel to solve the technical problem that enable signals of current array substrates cannot be input normally, In order to solve the problems mentioned above, the present disclosure provides the technical solutions as follows:

The present disclosure provides an array substrate includes:

an enable signal input terminal for inputting an enable signal during test of a panel; a preset electric potential input terminal for inputting a preset electric potential during test of the panel; a connection resistor connected to the enable signal input terminal and the preset electric potential input terminal, and a resistance value of the connection resistor being a predetermined multiple of a resistance value of the enable signal input terminal.

In the array substrate of the present disclosure, material of the connection resistor is polycrystalline silicon.

In the array substrate of the present disclosure, material of the connection resistor is a wide band gap material.

In the array substrate of the present disclosure, the resistance value of the connection resistor is greater than or equal to 400 times the resistance value of the enable signal input terminal.

In the array substrate of the present disclosure, a shape of the connection resistor is at least one of a circular shape, a rectangular shape, or a wave shape.

In the array substrate of the present disclosure, the connection resistor and an active layer of the array substrate are disposed on a same layer.

In the array substrate of the present disclosure, the connection resistor is disposed on a surface of the array substrate, and connected to the enable signal input terminal and the preset electric potential input terminal through vias.

In the array substrate of the present disclosure, the enable signal input terminal includes at least one of an array substrate testing terminal or a display panel testing terminal.

In the array substrate of the present disclosure, the connection resistor includes a first connection resistor and a second connection resistor. The first connection resistor is connected to the array substrate testing terminal and the preset electric potential input terminal. The second connection resistor is connected to the display panel testing terminal and the preset electric potential input terminal.

In the array substrate of the present disclosure, the array substrate testing terminal and the display panel testing terminal are disposed on a same layer.

The present disclosure further provides a display panel including an array substrate. The array substrate includes: an enable signal input terminal for inputting an enable signal during test of a panel; a preset electric potential input terminal for inputting a preset electric potential during test of the panel; a connection resistor connected to the enable signal input terminal and the preset electric potential input terminal, and a resistance value of the connection resistor being a predetermined multiple of a resistance value of the enable signal input terminal.

In the display panel of the present disclosure, material of the connection resistor is polycrystalline silicon.

In the display panel of the present disclosure, material of the connection resistor is a wide band gap material.

In the display panel of the present disclosure, the resistance value of the connection resistor is greater than or equal to 400 times the resistance value of the enable signal input terminal.

In the display panel of the present disclosure, a shape of the connection resistor is at least one of a circular shape, a rectangular shape, or a wave shape.

In the display panel of the present disclosure, the connection resistor and an active layer of the array substrate are disposed on a same layer.

In the display panel of the present disclosure, the connection resistor is disposed on a surface of the array substrate, and connected to the enable signal input terminal and the preset electric potential input terminal through vias.

In the display panel of the present disclosure, the enable signal input terminal includes at least one of an array substrate testing terminal or a display panel testing terminal.

In the display panel of the present disclosure, the connection resistor comprises a first connection resistor and a second connection resistor; the first connection resistor is connected to the array substrate testing terminal and the preset electric potential input terminal; and the second connection resistor is connected to the display panel testing terminal and the preset electric potential input terminal.

In the display panel of the present disclosure, the array substrate testing terminal and the display panel testing terminal are disposed on a same layer.

The beneficial effect of the present disclosure is that the present disclosure provides an array substrate and a display panel, and the array substrate includes an enable signal input terminal, a preset electric potential input terminal, and a connection resistor. The enable signal input terminal is for inputting an enable signal during test of a panel. The preset electric potential input terminal is for inputting a preset electric potential during test of the panel. The connection resistor is connected to the enable signal input terminal and the preset electric potential input terminal, and a resistance value of the connection resistor being a predetermined multiple of a resistance value of the enable signal input terminal. Through disposing the connection resistor between the enable signal input terminal and the preset electric potential input terminal, the enable signal can be input by the preset electric potential input terminal when the enable signal input terminal has poor connection due to having impurities.

DETAILED DESCRIPTION OF PREFERRED EMBODIMENTS

To more clearly illustrate embodiments or the technical solutions of the present disclosure, the accompanying figures of the present disclosure required for illustrating embodiments or the technical solutions of the present disclosure will be described in brief. Obviously, the accompanying figures described below are only part of the embodiments of the present disclosure, from which figures those skilled in the art can derive further figures without making any inventive efforts.

DETAILED DESCRIPTION OF PREFERRED EMBODIMENTS

The descriptions of embodiments below refer to accompanying drawings in order to illustrate certain embodiments which the present disclosure can implement. The directional terms of which the present disclosure mentions, for example, "top," "bottom," "upper," "lower," "front," "rear," "left," "right," "inside," "outside," "side," etc., are just refer to directions of the accompanying figures. Therefore, the used directional terms are for illustrating and understanding the present disclosure, but not for limiting the present disclosure. In the figures, units with similar structures are used same labels to indicate.

The present disclosure provides an array substrate to solve the technical problem that testing terminals of current array substrates have poor connection.

Figure 1:
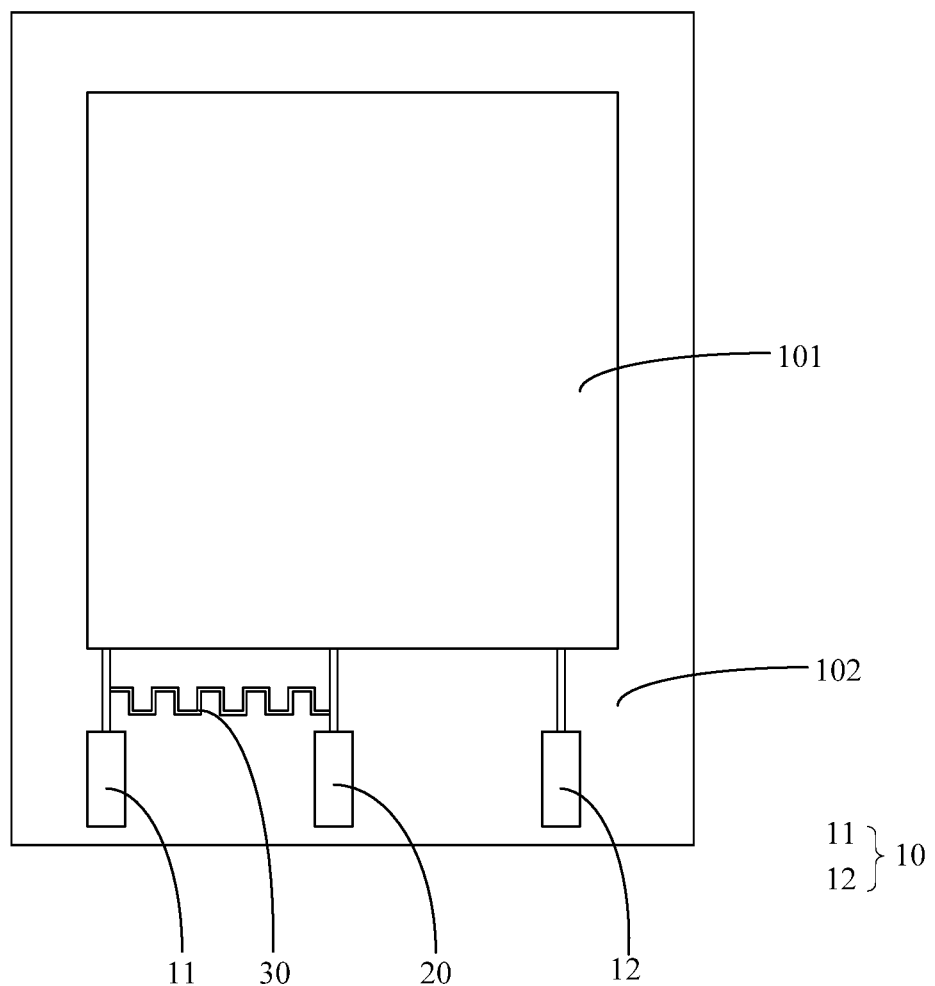
FIG. 1 is a schematic diagram of a first type structure of an array substrate provided by an embodiment of the present disclosure.

As illustrated in FIG. 1, it is a schematic diagram of a first type structure of an array substrate provided by an embodiment of the present disclosure. The array substrate 100 includes an enable signal input terminal 10, a preset electric potential input terminal 20, and a connection resistor 30. The connection resistor 30 is connected to the enable signal input terminal 10 and the preset electric potential input terminal 20, and a resistance value of the connection resistor 30 is a predetermined multiple of a resistance value of the enable signal input terminal 10.

The array substrate 100 includes a display region 101 and a non-display region 102. The enable signal input terminal 10, the preset electric potential input terminal 20, and connection resistor 30 are all located in the non-display region 102, and after the panel test has been finished, they are cut during the panel being cut.

The enable signal input terminal 10 is for inputting an enable signal during test of a panel to control a corresponding thin film transistor to turn on or turn off. The enable signal input terminal 10 includes at least one of an array substrate testing terminal 11 or a display panel testing terminal 12. In this embodiment, the enable signal input terminal 10 includes the array substrate testing terminal 11 and the display panel testing terminal 12.

As illustrated in FIG. 1, the connection resistor 30 is connected to the array substrate testing terminal 11 and the preset electric potential input terminal 20, that is, only disposing the connection resistor 30 between the array substrate testing terminal 11 and the preset electric potential input terminal 20. Of course, it can also only dispose the connection resistor 30 between the display panel testing terminal 12 and the preset electric potential input terminal 20.

In the manufacturing process of the array substrate, because factors such as operation of equipment, process environments, texture of raw material have a certain fluctuation, when the fluctuation is over process standards, poor processes will occur and affect product yield. In order to discover and feedback occasions of poor occurrence of each link of processes to perform the process improvement as soon as possible, and meanwhile repair poorness of occurrence as possible to increase final production yield of array manufacturing engineer, check and repair procedures are added on several links of the processes. Common tests are a array substrate test (array test, AT), a display panel test (cell test, CT), and a module test (MT), etc.

The array substrate test (array test, AT) is a detection method that after an array process has been finished, and pixels have structures with complete electrical function, uniformly charging all of the pixels on the panel, and then adopting a non-contact sensor to detect and compare differences and distribution laws of voltage of a surface of the pixels, thereby discovering various electrical defects.

The display panel test (cell test, CT) is a man-machine mix test of electrically driving a liquid crystal display panel on-line after the glass substrate is cut into liquid crystal cells.

The module test (MT) is a test of performance for a liquid crystal module after a liquid crystal display panel, a polarizer, a driving integrated circuit (IC), a printed circuit board, a driving circuit, and a backlight module assembled into the liquid crystal module.

In a production process, first performing the array substrate test, then performing the display panel test, and finally is the module test. During the array substrate test, the enable signal can be input by the array substrate testing terminal 11, and the preset electric potential signal can be input by the preset electric potential input terminal 20. During the display panel test, the enable signal can be input by the display panel testing terminal 12, and the preset electric potential signal can be input by the preset electric potential input terminal 20.

When testing, a test device inputs the enable signal by connecting a probe to the enable signal input terminal 10 to control the thin film transistor in the array substrate 100 to turn on or turn off. And then, it inputs the preset electric potential signal by connecting the probe to preset electric potential input terminal 20 to detect the corresponding thin film transistor.

During performing the array substrate test, using a method of contacting the probe to apply the enable signal and the preset electric potential to complete charge of the panel. After that, a sensor (not shown in figures) located on the display region 101 senses intensity of electric field on the surface of every pixels on the panel, and detects poorness of electrical properties of pixels by a voltage comparing method.

When the probe inputs low electric potential to the array substrate testing terminal 11, the thin film transistor in the array substrate 100 turns on, and the preset electric potential signal can be input into the thin film transistor, thereby the test performing normally. After the test has been finished, the probe inputs high electric potential to the array substrate testing terminal 11, and the thin film transistor turns off.

In order to ensure accuracy of the test, when performing the subsequent test, the thin film transistor tested before should be input high electric potential to turn off, thereby not affecting test result of the present test.

In prior art, the enable signal for turning off the thin film transistor is input by the enable signal input terminal 10 on the array substrate 100. However, the enable signal input terminal 10 is often poorly connected to the probe due to impurities, making high electric potential signal cannot be input, and the corresponding thin film transistor is not turned off, thereby the screen of the array substrate 100 will be abnormal during performing other tests, affecting test results.

Through disposing connection resistor 30 between the array substrate testing terminal 11 and the preset electric potential input terminal 20, even if the array substrate testing terminal 11 is poorly connected to the probe, the enable signal can be input as high electric potential by the preset electric potential input terminal 20, thereby turning off the corresponding thin film transistor, so that the present disclosure ensures the screen will not be abnormal when be lit up during testing steps.

A resistance value of the connection resistor 30 is generally large, and is a predetermined multiple of a resistance value of the enable signal input terminal 10. In this embodiment, because only disposing the connection resistor 30 between the array substrate testing terminal 11 and the preset electric potential input terminal 20, the resistance value of the connection resistor 30 is greater than or equal to 400 times the resistance value of the array substrate testing terminal 11.

During performing the array substrate test, if connection between the array substrate testing terminal 11 and the probe is great, the probe inputs low electric potential by the array substrate testing terminal 11, and the thin film transistor turns on. Meanwhile, the probe inputs preset high electric potential through the preset electric potential input terminal 20, in this way, both sides of the connection resistor 30 have potential difference. However, because the resistance value of the connection resistor 30 is large, the voltage from the potential difference will be released as heat on the connection resistor 30. Comparing to the array substrate testing terminal 11, the resistance value of the connection resistor 30 is greater than or equal to 400 times the resistance value of the array substrate testing terminal 11, and the resistance of the array substrate testing terminal can be ignored, almost the partial voltage of the potential difference mentioned above is on the connection resistor 30. Therefore, if the resistance value of the connection resistor 30 is large enough, and connection between the array substrate testing terminal 11 and the probe is good, it will not affect the array substrate testing terminal 11 to input the enable signal.

If the array substrate testing terminal 11 is poorly connected to the probe, the enable signal can be input as high electric potential by the preset electric potential input terminal 20, thereby turning off the corresponding thin film transistor, so that ensures the screen will not be abnormal when be lit up during steps of the subsequent panel test and the subsequent module test.

In order to ensure the resistance value of the connection resistor 30 is large enough, polycrystalline silicon is generally adopted on the connection resistor 30. Furthermore, because the wider of a band gap of material is, the higher resistivity is, wide band gap material, such as indium nitride (InN), gallium nitride (GaN), aluminum nitride (AlN), or alloy of InN, GaN, and AlN can also be adopted on the connection resistor.

In actual production, a distance between the array substrate testing terminal 11 and the preset electric potential input terminal 20 is small. In order to ensure the resistance value of the connection resistor 30 is large enough, a shape of the connection resistor 30 is generally designed as a wave shape as illustrated in FIG. 1, which is bent to-and-fro in a small pitch to increase a length to increase the resistance. Of course, the connection resistor 30 may be other shapes, such as at least one of a circular shape, a rectangular shape, or a wave shape.

Through disposing the connection resistor 30, when the array substrate testing terminal 11 is poorly connected to the probe due to having impurities, the enable signal can be input as high electric potential through the preset electric potential input terminal 20, thereby turning off the thin film transistor testing in the step of the array substrate test, so that ensures the screen will not be abnormal during steps of the panel test and the module test.

When the connection resistor 30 is connected to the display panel testing terminal 12 and the preset electric potential input terminal 20, the working principle of the connection resistor 30 is same as the principle in the embodiments mentioned above. Through disposing the connection resistor 30, when the display panel testing terminal 12 is poorly connected to the probe due to having impurities, the enable signal can be input as high electric potential through the preset electric potential input terminal 20, thereby turning off the thin film transistor testing in the step of the array substrate test, so that ensures the screen will not be abnormal when be lit up during the step of the subsequent module test.

Figure 2:
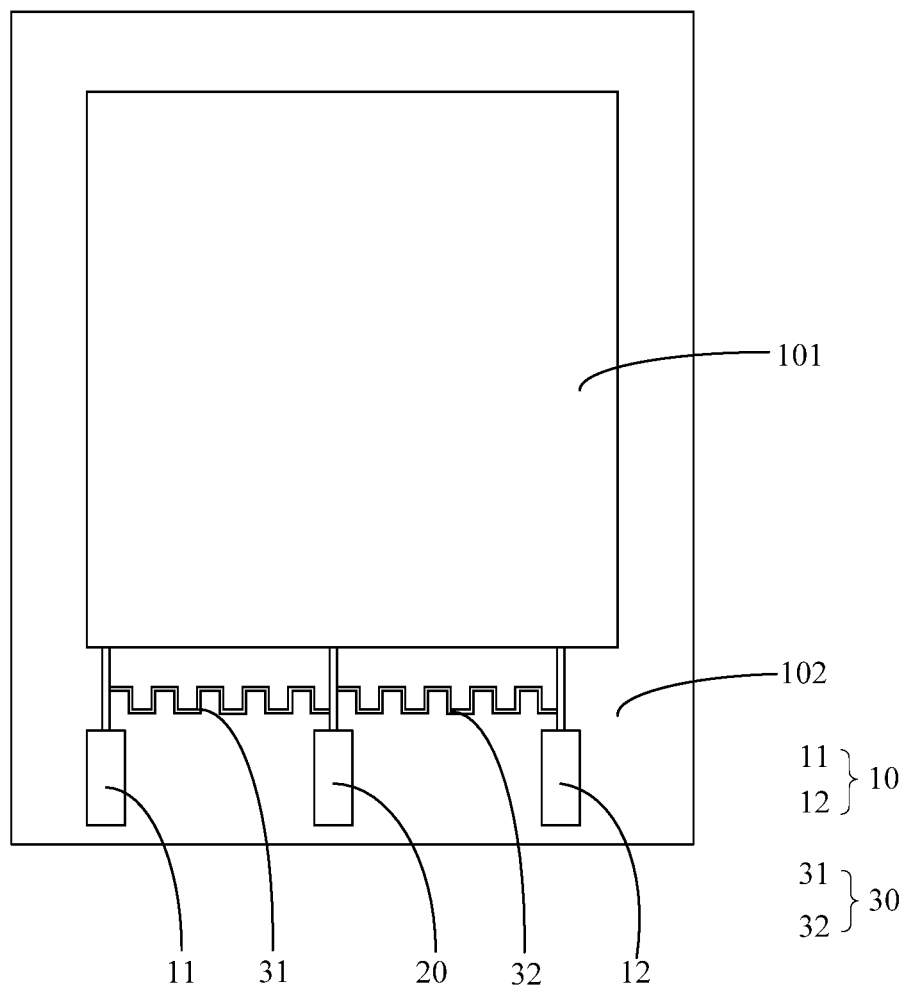
FIG. 2 is a schematic diagram of a second type structure of an array substrate provided by an embodiment of the present disclosure.

As illustrated in FIG. 2, it is a schematic diagram of a second type structure of an array substrate provided by an embodiment of the present disclosure. The array substrate 100 includes an enable signal input terminal 10, a preset electric potential input terminal 20, and a connection resistor 30.

In this embodiment, the connection resistor 30 includes a first connection resistor 31 and a second connection resistor 32. The first connection resistor 31 is connected to the array substrate testing terminal 11 and the preset electric potential input terminal 20. The second connection resistor 32 is connected to the display panel testing terminal 12 and the preset electric potential input terminal 20.

A resistance value of the connection resistor 30 is a predetermined multiple of a resistance value of the enable signal input terminal 10. In this embodiment, a resistance value of the first connection resistor 31 is greater than or equal to 400 times a resistance value of the array substrate testing terminal 11, and a resistance value of the second connection resistor 32 is greater than or equal to 400 times a resistance value of the display panel testing terminal 12.

During performing the array substrate test, if connection between the array substrate testing terminal 11 and the probe is great, the probe inputs low electric potential by the array substrate testing terminal 11, and the thin film transistor turns on. Meanwhile, the probe inputs preset high electric potential through the preset electric potential input terminal 20, in this way, both sides of the first connection resistor 31 have potential difference. However, because the resistance value of the first connection resistor 31 is large, the voltage from the potential difference will be released as heat on the first connection resistor 31. Comparing to the array substrate testing terminal 11, the resistance value of the first connection resistor 31 is greater than or equal to 400 times the resistance value of the array substrate testing terminal 11, and the resistance of the array substrate testing terminal 11 can be ignored, almost the partial voltage of the potential difference mentioned above is on the first connection resistor 31. Therefore, if the resistance value of the first connection resistor 31 is large enough, and connection between the array substrate testing terminal 11 and the probe is good, it will not affect the array substrate testing terminal 11 to input the enable signal.

If the array substrate testing terminal 11 is poorly connected to the probe, the enable signal can be input as high electric potential by the preset electric potential input terminal 20, thereby turning off the corresponding thin film transistor, so that ensures the screen will not be abnormal when be lit up during steps of the subsequent panel test and the subsequent module test.

Also, during performing the array substrate test, if connection between the display panel testing terminal 12 and the probe is great, the probe inputs low electric potential by the display panel testing terminal 12, and the thin film transistor turns on. Meanwhile, the probe inputs preset high electric potential through the preset electric potential input terminal 20, in this way, both sides of the second connection resistor 32 have potential difference. However, because the resistance value of the second connection resistor 32 is large, the voltage from the potential difference will be released as heat on the second connection resistor 32. Comparing to the display panel testing terminal 12, the resistance value of the second connection resistor 32 is greater than or equal to 400 times the resistance value of the display panel testing terminal 12, and the resistance of the display panel testing terminal 12 can be ignored, almost the partial voltage of the potential difference mentioned above is on the second connection resistor 32. Therefore, if the resistance value of the second connection resistor 32 is large enough, and connection between the display panel testing terminal 12 and the probe is good, it will not affect the display panel testing terminal 12 to input the enable signal.

If the display panel testing terminal 12 is poorly connected to the probe, the enable signal can be input as high electric potential by the preset electric potential input terminal 20, thereby turning off the corresponding thin film transistor, so that ensures the screen will not be abnormal when be lit up during the step of the subsequent module test.

Material of the first connection resistor 31 and the second connection resistor 32 can be same or different. In order to ensure the resistance value of the connection resistor 30 is large enough, polycrystalline silicon is generally adopted on the connection resistor 30. Moreover, in actual production, a distance between the array substrate testing terminal 11 and the preset electric potential input terminal 20 is small. In order to ensure the resistance value of the connection resistor 30 is large enough, a shape of the connection resistor 30 is generally designed as a wave shape as illustrated in FIG. 2, which is bent to-and-fro in a small pitch to increase a length to increase the resistance. Of course, the connection resistor 30 may be other shapes, such as at least one of a circular shape, a rectangular shape, or a wave shape.

Figure 3:
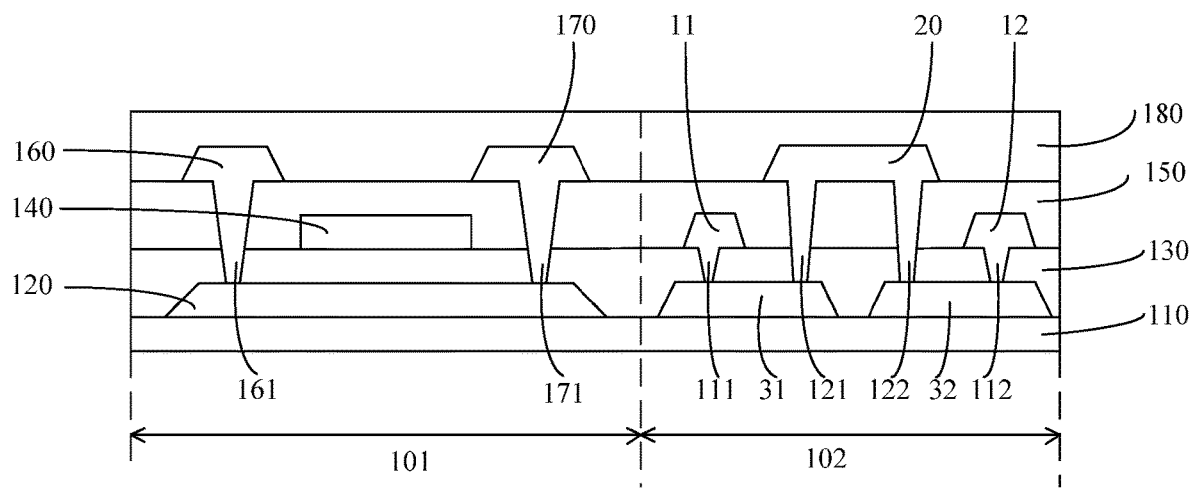
FIG. 3 is a schematic diagram of a first type position of a connection resistor in an array substrate provided by an embodiment of the present disclosure.

There are various ways of disposing the connection resistor 30 in the array substrate 100. Take a top-gate structure as an example, as illustrated in FIG. 3, it is a schematic diagram of a first type position of a connection resistor provided by an embodiment of the present disclosure. The array substrate 100 includes a substrate 110, an active layer 120, a gate insulating layer 130, a gate electrode layer, an interlayer insulation layer 150, a source drain electrode layer and a passivation layer 180 which are disposed layer by layer.

The gate electrode layer is patterned to form a gate electrode 140. The source drain electrode layer is patterned to form a source electrode 160 and a drain electrode 170. The source electrode 160 is electrically connected to the active layer 120 by penetrating a first via 161 of the gate insulating layer 130 and the interlayer insulation layer 150. The drain electrode 170 is electrically connected to the active layer 120 by penetrating a second via 171 of the gate insulating layer 130 and the interlayer insulation layer 150.

When the connection resistor 30 is polycrystalline silicon material, because the active layer 120 is generally also polycrystalline silicon material, the connection resistor 30 and the active layer 120 can be disposed on a same layer. The connection resistor 30 is located on the non-display region 102 of the array substrate 100, as illustrated in FIG. 3, a first connection resistor 31 and a second connection resistor 32 are both disposed on a same layer with the active layer 120. The first connection resistor 31 and the second connection resistor 32 can be connected to each other, or can be insulated to each other.

During performing a panel test, data lines and scan lines are generally divided into several groups, and are respectively converged on test terminals by a short-circuit method. The testing terminals, and the corresponding data lines or the corresponding scan lines can be disposed on a same layer.

In an embodiment, the array substrate testing terminal 11 and the display panel testing terminal 12 are disposed on a same layer.

The array substrate testing terminal 11 is connected to the scan lines of the array substrate 100, and inputs the enable signal to control the thin film transistor to turn on or to turn off. The display panel testing terminal 12 is also connected to the scan lines of the array substrate 100, and inputs the enable signal to control the thin film transistor to turn on or to turn off. Therefore, the array substrate testing terminal 11, the display panel testing terminal 12, and the gate electrode 140 can be disposed in a same layer, that is, the gate electrode layer is patterned to form the gate electrode 140, the array substrate testing terminal 11, and the display panel testing terminal 12. Further, the gate electrode 140 is located on the display region 101 of the array substrate 100, and the array substrate testing terminal 11 and the display panel testing terminal 12 are located on the non-display region 102.

Of course, the disposing way of the array substrate testing terminal 11 and the display panel testing terminal 12 is not limited to, they can also be disposed on a surface of the array substrate 100 or on other layers, or the array substrate testing terminal 11 and the display panel testing terminal 12 can be disposed on different layers, and the scan lines in the array substrate 100 can be connected to the corresponding enable signal input terminal 10 through vias.

After the thin film transistor turned on, the preset electric potential input terminal 20 inputs the preset electric potential. Therefore, the array substrate testing terminal 11, the source electrode 160, and the drain electrode 170 can be disposed on a same layer, that is, the source drain electrode layer is patterned to form the source electrode 160, the drain electrode 170, and the preset electric potential input terminal 20. Further, the source electrode 160 and the drain electrode 170 are located in the display region 101 of the array substrate 100, and the preset electric potential input terminal 20 is located in the non-display region 102.

The array substrate testing terminal 11 is connected to the first connection resistor 31 by a third via 111 formed in the gate insulating layer 130, and the preset electric potential input terminal 20 is connected to the first connection resistor 31 by a fourth via 121 formed in the interlayer insulation layer 150.

The display panel testing terminal 12 is connected to the second connection resistor 32 by a fifth via 112 formed in the gate insulating layer 130, and the preset electric potential input terminal 20 is connected to the second connection resistor 32 by a sixth via 122 formed in the interlayer insulation layer 150.

Figure 4:
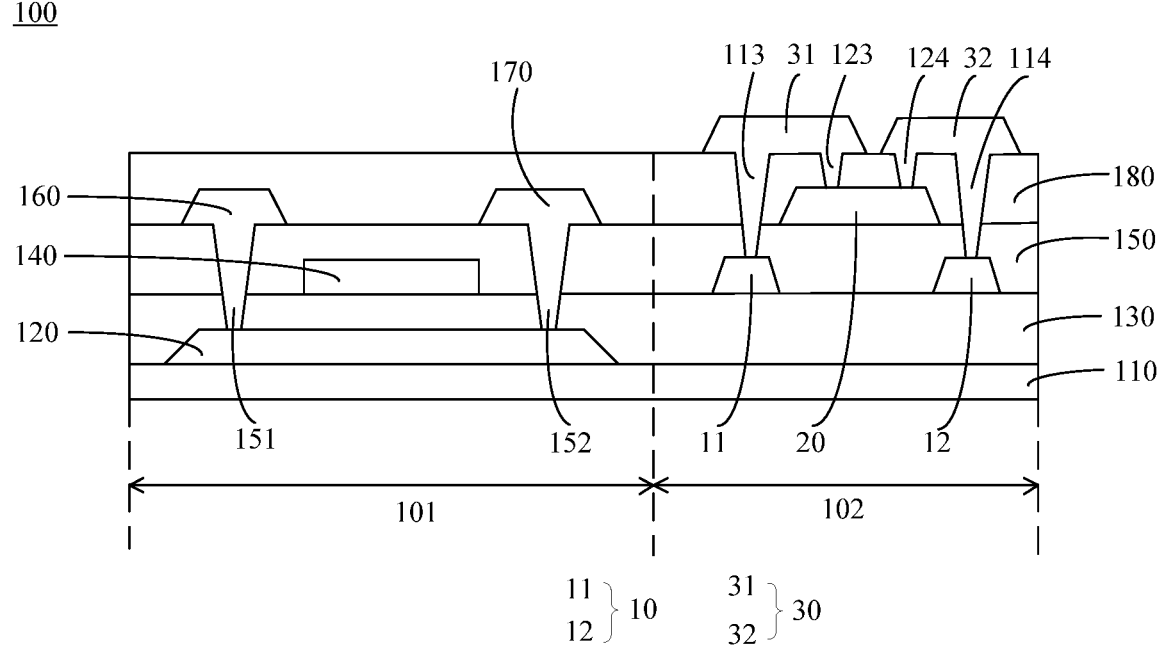
FIG. 4 is a schematic diagram of a second type position of a connection resistor in an array substrate provided by an embodiment of the present disclosure.

As illustrated in FIG. 4, it is a schematic diagram of a second type position of a connection resistor in an array substrate provided by an embodiment of the present disclosure. The array substrate 100 includes a substrate 110, an active layer 120, a gate insulating layer 130, a gate electrode layer, an interlayer insulation layer 150, a source drain electrode layer, and a passivation layer 180 which are disposed layer by layer.

The difference from the structure in FIG. 3 is that the first connection resistor 31 and the second connection resistor 32 are both disposed on a surface of the array substrate 100.

The array substrate testing terminal 11 is connected to the first connection resistor 31 by a seventh via 113 formed in the interlayer insulation layer 150 and the passivation layer 180, and the preset electric potential input terminal 20 is connected to the first connection resistor 31 by a eighth via 123 formed in the passivation layer 180.

The display panel testing terminal 12 is connected to the second connection resistor 32 by a ninth via 114 formed in the interlayer insulation layer 150 and the passivation layer 180, and the preset electric potential input terminal 20 is connected to the second connection resistor 32 by a tenth via 124 formed in the passivation layer 180.

Of course, the disposing way of the connection resistor 30 is not limited to, the first connection resistor 31 and the second connection resistor 32 can be disposed on different layers of the array substrate 100. For example, the first connection resistor 31 is disposed on a surface of the array substrate 100, and the second connection resistor 32 and the active layer 120 of the array substrate 100 are disposed on a same layer.

In FIG. 3 and FIG. 4, a top-gate type structure is taken as an example. For other types of structures such as a top-gate type structure, the disposing way of the connection resistor 30 is also applicable.

Through disposing the first connection resistor 31, when the array substrate testing terminal 11 is poorly connected to the probe due to having impurities, the enable signal can be input as high electric potential through the preset electric potential input terminal 20, thereby turning off the thin film transistor testing in the step of the array substrate test, so that ensures the screen will not be abnormal during other testing steps. Through disposing the second connection resistor 32, when the display panel testing terminal 12 is poorly connected to the probe due to having impurities, the enable signal can be input as high electric potential through the preset electric potential input terminal 20, thereby turning off the thin film transistor testing in the step of the array substrate test, so that ensures the screen will not be abnormal during other testing steps.

The present disclosure further provides a display panel including an array substrate. The array substrate includes an enable signal input terminal, a preset electric potential input terminal, and a connection resistor. The connection resistor is connected to the enable signal input terminal and the preset electric potential input terminal, and a resistance value of the connection resistor is a predetermined multiple of a resistance value of the enable signal input terminal.

In an embodiment, material of the connection resistor is polycrystalline silicon.

In an embodiment, material of the connection resistor is a wide band gap material.

In an embodiment, the resistance value of the connection resistor is greater than or equal to 400 times the resistance value of the enable signal input terminal.

In an embodiment, a shape of the connection resistor is at least one of a circular shape, a rectangular shape, or a wave shape.

In an embodiment, the connection resistor and an active layer of the array substrate are disposed on a same layer.

In an embodiment, the connection resistor is disposed on a surface of the array substrate, and connected to the enable signal input terminal and the preset electric potential input terminal through vias.

In an embodiment, the enable signal input terminal includes at least one of an array substrate testing terminal or a display panel testing terminal.

In an embodiment, the connection resistor includes a first connection resistor and a second connection resistor. The first connection resistor is connected to the array substrate testing terminal and the preset electric potential input terminal. The second connection resistor is connected to the display panel testing terminal and the preset electric potential input terminal.

In an embodiment, the array substrate testing terminal and the display panel testing terminal are disposed on a same layer.

According to embodiments mentioned above can understand that the present disclosure provides an array substrate and a display panel, and the array substrate includes an enable signal input terminal, a preset electric potential input terminal, and a connection resistor; the enable signal input terminal is for inputting an enable signal during test of the panel; the preset electric potential input terminal is for inputting a preset electric potential during test of the panel; the connection resistor is connected to the enable signal input terminal and the preset electric potential input terminal, and a resistance value is a predetermined multiple of a resistance value of the enable signal input terminal. Through disposing the connection resistor between the enable signal input terminal and the preset electric potential input terminal, the enable signal can be input by the preset electric potential input terminal when the enable signal input terminal has poor connection due to having impurities.

In summary, although the present disclosure has disclosed the preferred embodiments as above, however the above-mentioned preferred embodiments are not to limit to the present disclosure. A person skilled in the art can make any change and modification, therefore the scope of protection of the present disclosure is subject to the scope defined by the claims.

What is claimed is:

1. An array substrate, comprising:
    an enable signal input terminal for inputting an enable signal during test of a panel;
    a preset electric potential input terminal for inputting a preset electric potential during test of the panel;
    a connection resistor connected to the enable signal input terminal and the preset electric potential input terminal, wherein a resistance value of the connection resistor is a predetermined multiple of a resistance value of the enable signal input terminal.

2. The array substrate as claimed in claim 1, wherein material of the connection resistor is polycrystalline silicon.

3. The array substrate as claimed in claim 1, wherein material of the connection resistor is a wide band gap material.

4. The array substrate as claimed in claim 1, wherein the resistance value of the connection resistor is greater than or equal to 400 times the resistance value of the enable signal input terminal.

5. The array substrate as claimed in claim 1, wherein a shape of the connection resistor is at least one of a circular shape, a rectangular shape, or a wave shape.

6. The array substrate as claimed in claim 1, wherein the connection resistor and an active layer of the array substrate are disposed on a same layer.

7. The array substrate as claimed in claim 1, wherein the connection resistor is disposed on a surface of the array substrate, and connected to the enable signal input terminal and the preset electric potential input terminal through vias.

8. The array substrate as claimed in claim 1, wherein the enable signal input terminal comprises at least one of an array substrate testing terminal or a display panel testing terminal.

9. The array substrate as claimed in claim 8, wherein the connection resistor comprises a first connection resistor and a second connection resistor; the first connection resistor is connected to the array substrate testing terminal and the preset electric potential input terminal; and the second connection resistor is connected to the display panel testing terminal and the preset electric potential input terminal.

10. The array substrate as claimed in claim 9, wherein the array substrate testing terminal and the display panel testing terminal are disposed on a same layer.

11. A display panel, comprising: an array substrate, and the array substrate comprising:
an enable signal input terminal for inputting an enable signal during test of a panel;
a preset electric potential input terminal for inputting a preset electric potential during test of the panel;
a connection resistor connected to the enable signal input terminal and the preset electric potential input terminal, wherein a resistance value of the connection resistor is a predetermined multiple of a resistance value of the enable signal input terminal.

12. The display panel as claimed in claim 11, wherein material of the connection resistor is polycrystalline silicon.

13. The display panel as claimed in claim 11, wherein material of the connection resistor is a wide band gap material.

14. The display panel as claimed in claim 11, wherein the resistance value of the connection resistor is greater than or equal to 400 times the resistance value of the enable signal input terminal.

15. The display panel as claimed in claim 11, wherein a shape of the connection resistor is at least one of a circular shape, a rectangular shape, or a wave shape.

16. The display panel as claimed in claim 11, wherein the connection resistor and an active layer of the array substrate are disposed on a same layer.

17. The display panel as claimed in claim 11, wherein the connection resistor is disposed on a surface of the array substrate, and connected to the enable signal input terminal and the preset electric potential input terminal through vias.

18. The display panel as claimed in claim 11, wherein the enable signal input terminal comprises at least one of an array substrate testing terminal or a display panel testing terminal.

19. The display panel as claimed in claim 18, wherein the connection resistor comprises a first connection resistor and a second connection resistor; the first connection resistor is connected to the array substrate testing terminal and the preset electric potential input terminal; and the second connection resistor is connected to the display panel testing terminal and the preset electric potential input terminal.

20. The display panel as claimed in claim 19, wherein the array substrate testing terminal and the display panel testing terminal are disposed on a same layer.

* * * * *